Figure 1:
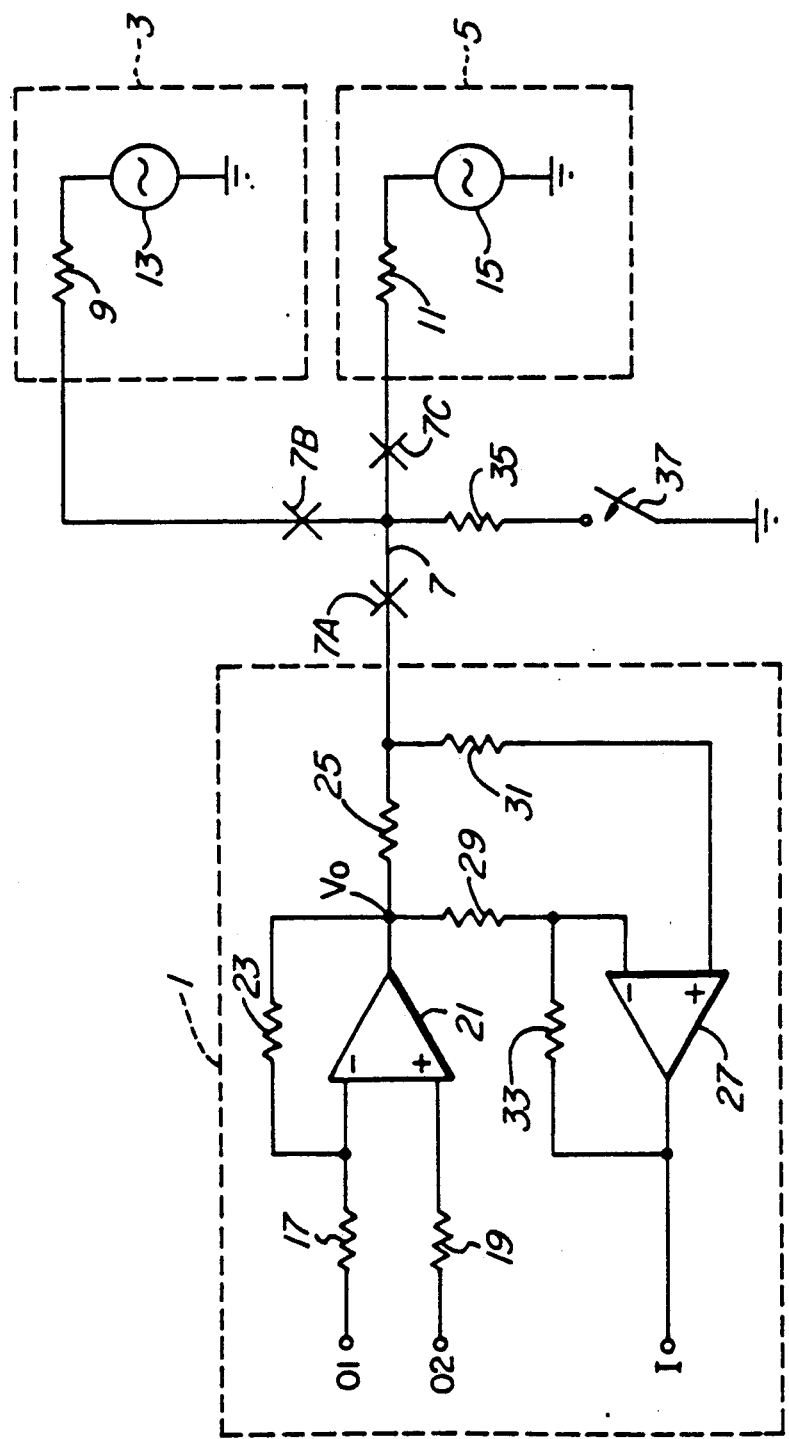

United States Patent [19]

Molnar

[11] Patent Number: 5,054,062

[45] Date of Patent: Oct. 1, 1991

[54] CIRCUIT FOR MAINTAINING HYBRID CANCELLATION OF SIGNALS IN A COMMUNICATION SYSTEM

[75] Inventor: Gerald Molnar, Ottawa, Canada

[73] Assignee: Trillium Telephone Systems Inc., Canada

[21] Appl. No.: 420,648

[22] Filed: Oct. 11, 1989

Related U.S. Application Data

[63] Continuation of Ser. No. 850,241, Apr. 10, 1986, abandoned.

[30] Foreign Application Priority Data

Dec. 13, 1985 [CA] Canada ................. 497669

[51] Int. Cl.⁵ ............................................. H04M 1/00
[52] U.S. Cl. ................................. 379/402; 379/202; 379/398
[58] Field of Search ............ 379/202, 203, 204, 405, 379/413, 394, 402, 403, 404, 345, 398; 340/425

[56] References Cited

U.S. PATENT DOCUMENTS

| | | |
|---|---|---|
| 3,622,708 | 11/1971 | Guenther et al. ............... 379/202 |
| 3,991,279 | 11/1976 | Morgan et al. ................... 379/202 |
| 3,991,280 | 11/1976 | Jones et al. ...................... 379/202 |
| 4,090,043 | 5/1978 | Oulton ............................. 379/402 |
| 4,146,753 | 3/1979 | D'Arrigo et al. ................ 379/395 |
| 4,301,336 | 11/1981 | Müting ............................. 379/405 |

FOREIGN PATENT DOCUMENTS

| | | |
|---|---|---|
| 1038609 | 9/1958 | Fed. Rep. of Germany ...... 379/202 |
| 3040271 | 4/1982 | Fed. Rep. of Germany ...... 379/202 |
| 3144267 | 7/1983 | Fed. Rep. of Germany ...... 379/202 |

OTHER PUBLICATIONS

Translation of Patent DE 3,144,267 A1.
"Analog Multi-Party Conference Circuit", Reynes et al., IBM Technical Disclosure Bulletin, vol. 25, No. 3A, Aug. 1982, pp. 1007–1008.

*Primary Examiner*—Jin F. Ng
*Assistant Examiner*—Jhancy Augustus
*Attorney, Agent, or Firm*—Laff, Whitesel, Conte & Saret

[57] ABSTRACT

A circuit for maintaining hybrid cancellation of signals carried by a signal bus of a communication system, in response to variations in the number of hybrid circuits connected to the bus. One or more microprocessor control switches are utilized for selectively connecting one or more balancing load impedances to the bus in response to variations in the number of hybrid circuits connected thereto, such that a constant total load impedance is maintained on the bus. Also, circuitry is associated with each of the hybrid circuits for effecting hybrid cancellation of signals on the bus relative to the constant total load impedance. The circuit is of simple design and construction, occupying every little circuit board area and being of very low cost.

15 Claims, 2 Drawing Sheets

CIRCUIT FOR MAINTAINING HYBRID CANCELLATION OF SIGNALS IN A COMMUNICATION SYSTEM

This application is a continuation of application Ser. No. 06/850,241, filed Apr. 10, 1986, now abandoned.

This invention relates in general to comunication systems and more particularly to a circuit for maintaining hybrid cancellation of signals carried by a signal bus of a communication system in response to variations in the number of hybrid circuits connected to the bus.

A well known function of modern day communication systems such as PABXs and key telephone systems, is the interconnection of two or more signal circuits such as subscriber sets and outside telephone lines to a common signal bus, such as a junctor. Subscriber sets and outside telephone lines are typically connected via hybrid circuits to one or more switching matrices for interconnecting the sets and telephone lines to the junctor under control of a central microprocessor. The hybrid circuits typically form part of well known subscriber line interface circuits and trunk circuits connected between the switching matrices and connection the subscriber sets and outside telephone lines respectively.

In operation, hybrid circuits transmit outbound signals generated by the subscriber set or telephone line to the junctor, receive inbound signals from the junctor for transmission to the subscriber set or line, and cancel the outbound signals applied to the junctor from being received by the hybrid circuit and fed back to the set or line. Receiver amplifiers of the hybrid circuits typically have their gains set in order that incoming signals are differentially applied to the inputs thereof while outbound signals are applied as common mode signals to the inputs and are cancelled therein.

In the event of a conference call in which three or more signal circuits are connected to the junctor, the impedance of the junctor is lowered in response to the loads associated with the additional hybrid circuits being connected in parallel to the junctor. Consequently, the outgoing signals are not applied as common mode signals to the inputs of the receive amplifier and are not completely cancelled therein. The uncancelled outbound signals are thus transmitted as unwanted side tone to the subscriber set or telephone line connected to the hybrid circuit. The unwanted side tone signals can in some instances cause the hybrid circuits to become unstable and go into oscillation.

According to prior art techniques for maintaining hybrid cancellation during conference calls, gain switching circuitry is utilized for varying the input resistance to inverting and non-inverting inputs of the hybrid circuit receive amplifiers in response to variations in the number of signal circuits connected to the junctor in order that the outgoing signals be applied to the inputs as common mode signals. The gain switching circuitry is complex and expensive, particularly since such circuitry must be incorporated in each of the hybrid circuits of the system.

According to the present invention, the gains of the individual receiver amplifiers of each of the hybrid circuits is set to provide proper cancellation when a predetermined total load impedance is connected to the junctor, corresponding to a conference call involving a predetermined number of parties. A circuit is provided for selectively connecti    one or more balancing load impedance to the junctor in response to variations in the number of hybrid circuits actually connected to the junctor, such that a constant total load impedance is maintained on the junctor. Thus, the individual gains of receive amplifiers of the hybrid circuits need not be varied, as in the prior art circuits. The circuit is of simple design and low cost, and occupies very little circuit board area in relation to prior art circuits.

Figure 2:
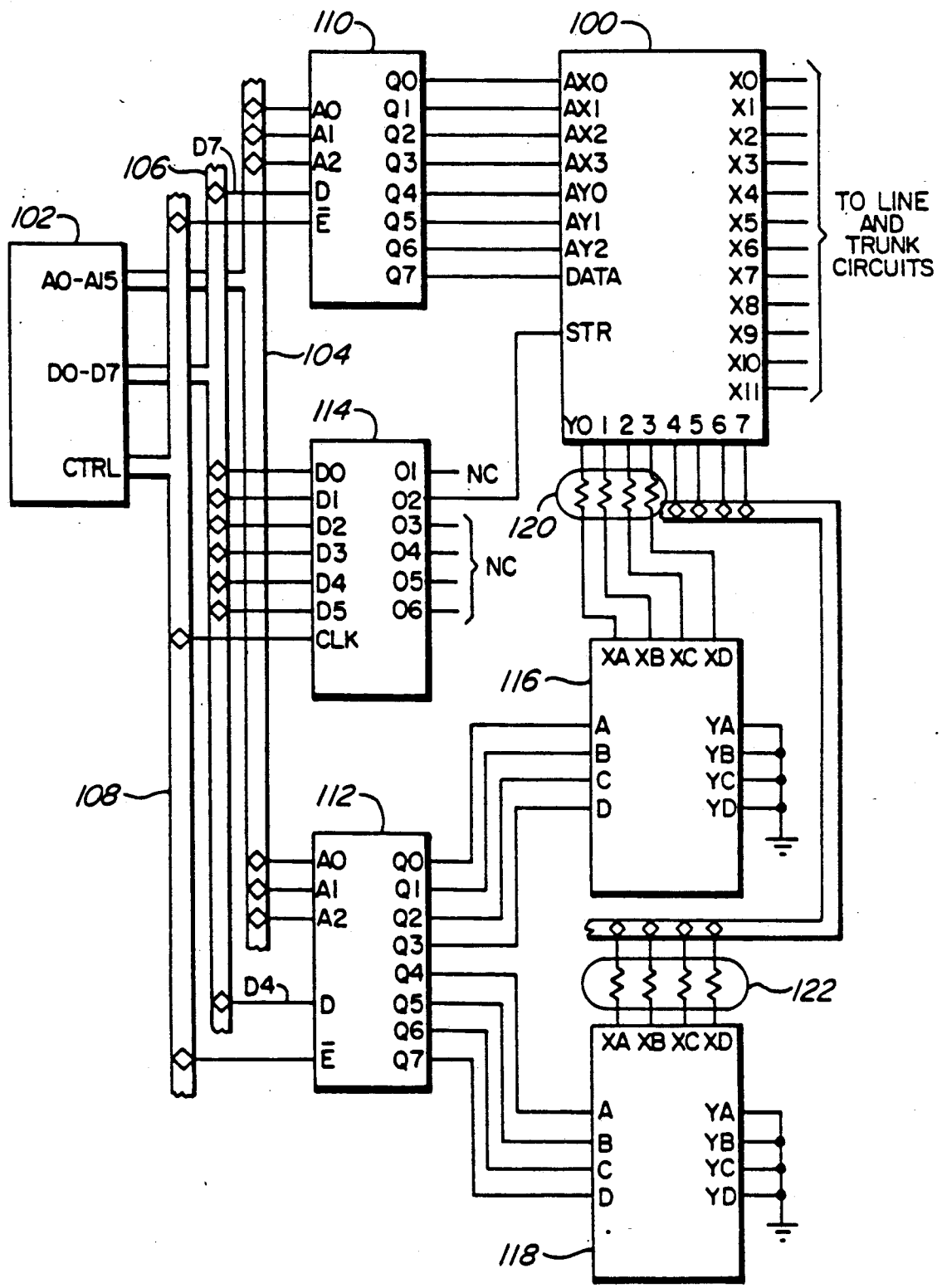

A better understanding of the invention will be obtained with reference to the detailed description below in conjunction with the following drawings, in which:

FIG. 1 is a schematic diagram of a circuit according to the invention in its broadest form, and FIG. 2 is a schematic diagram of a preferred implementation of the circuit according to the present invention.

With reference to FIG. 1, three hybrid circuits, denoted as 1, 3, and 5, are shown connected to a common signal bus, such as a junctor 7. The circuitry of the hybrid circuit 1 is shown in detail while the circuitry of hybrid circuits 3 and 5 is shown schematically as a load resistor (9 or 11) connected to a source of AC signal ground via a signal source (13 or 15).

With reference to hybrid circuit 1, outgoing signals from a subscriber set or telephone line appearing on terminals 01 and 02 are applied differentially via input resistors 17 and 19 to inverting and non-inverting inputs respectively of a differential amplifier 21. An output of differential amplifier 21 is connected to the inverting input thereof via feedback resistor 23 in a well known manner. The output is also connected via an output resistor 25 to the junctor 7.

Incoming signals from junctor 7 are applied differentially to the inverting and non-inverting inputs of a further differential amplifier 27 via resistor 25 and input resistors 29 and 31. An output of differential amplifier 27 is connected to the inverting input thereof via a feedback resistor 33, and to an incoming signal terminal I.

Hybrid circuits 1, 3 and 5 are typically connected to the junctor 7 in a well known manner via switching circuitry such as a solid state crosspoint switching matrix, shown diagrammatically by crosspoint connections 7A, 7B and 7C.

A junctor balancing load impedance, otherwise known as a dummy junctor load, is designated by reference numeral 35 and is connected via a switch 37 to the source of AC signal ground, as described in greater detail below.

Prior to describing operation of the present invention, normal operation of the hybrid circuit will be considered, disregarding momentarily the effects of the balancing load impedance 35.

Consider the well known scenario of a two party call between a pair of hybrid circuits, such as circuits 1 and 3 (i.e. circuit 5 is disconnected from junctor 7 via switch 7C). Outgoing signals appearing on terminals 01 and 02 are amplified in differential amplifier 21 and applied to junctor 7 via output resistor 25 of hybrid circuit 1. Each of the hybrid circuits (such as circuits 1, 3 and 5), preferably exhibit identical load impedances to the junctor (i.e. resistors 9, 11 and 25 are each typically 600 ohms). Thus, an output voltage $V_o$ appearing on the output of differential amplifier 21 is applied to the inverting input of amplifier 27 via resistor 29 while a voltage of $V_o/2$ appears on the node connecting resistors 25 and 9 as a result of voltage division across these resistors. The $V_o/2$ signal is applied to the non-inverting input of amplifier 27 via resistor 31. Thus, according to well known prior art hybrid circuits, the gain of amplifier 27 was typically set by selecting appropriate values of resistors 29, 31 and 33 in order that signals applied to the non-inverting input of amplifier 27 were multiplied by a gain factor of 2 while signals applied to the inverting input were amplified with unity gain, resulting in complete hybrid cancellation of outgoing signals applied to junctor 7.

In the event a conference call is established in response to connection of the additional hybrid circuit 5 to junctor 7 via switch 7C, the voltage appearing on junctor 7 due to a signal $V_o$ appearing on the output of amplifier 21, would be at an amplitude level of $V_o/3$. Accordingly, with the aforementioned gain values, the outgoing signals would not be completely cancelled in amplifier 27, resulting in generation of unwanted side tone.

According to the present invention, the gain of amplifier 27 is adjusted to provide proper hybrid cancellation for a junctor load impedance corresponding to a predetermined maximum number of hybrid circuits being connected to the junctor 7. For example, in the event that a maximum of three parties are to be conferenced, the gain of amplifier 27 is adjusted to provide a gain factor of unity for signals applied to the inverting input and a gain factor of three for signals applied to the non-inverting input.

Thus, in the event of a three party conference, switch 37 is left open, and the signal $V_o/3$ is applied to the non-inverting input of amplifier 27 resulting in proper cancellation. In the event of a normal two party call (i.e. hybrid circuit 5 is disconnected via opening switch 7C), the switch 37 is closed under control of an external controller (such as a microprocessor) thereby connecting a balancing load impedance 35 between the junctor 7 and the source of AC signal ground. In this way, the load impedance connected to junctor 7 is maintained constant in response to variations in the number of hybrid circuits connected to the junctor 7, such that proper hybrid cancellation is maintained in the hybrid circuits.

Alternatively, the circuit could be modified to accommodate four party conferences, in which the gain of receiver amplifiers (such as amplifier 27) associated with each hybrid circuit would be required to be set to provide a gain factor of 4 for signals appearing on the non-inverting inputs thereof, and a pair of switchable balancing impedances would be connected in parallel to the junctor 7. Thus, in the event of a four party conference, the pair of balancing load impedances would be disconnected from junctor 7. In the event of a three party conference, one of the balancing load impedances would be connected to the junctor, and in the event of a standard two party call, both of the balancing load impedances would be connected to junctor 7.

Similarly, conferences involving a larger number of parties can be accommodated according to the circuit of the present invention by setting the gains of the various hybrid circuit receive amplifiers to appropriate values, and inclusion of additional switchable balancing load impedances.

With reference to FIG. 2, illustrating the circuit according to the preferred embodiment in which three party conference calls are accommodated, a crosspoint switching matrix 100 is shown, having bidirectional ports X0-X11 for connection to a plurality of hybrid circuits (such as line and trunk circuits). As discussed above, the receive amplifiers of predetermined ones of the hybrid circuits disposed in the subscriber line interface circuits and trunk circuits are set such that signals applied to the non-inverting inputs thereof are multiplied by a gain factor of 3, in a well known manner.

One, two or three of the hybrid circuits may be internally connected via matrix 100 to one of eight junctors, designated as Y0-Y7, in response to predetermined control signals being applied to control inputs AX0-AX3, AY0-AY2 and the DATA input of the matrix 100. A microprocessor 102 generates predetermined address, data and control signals on terminals A0-A15, D0-D7 and CTRL respectively. These signals are applied to predetermined lines of an address bus 104, a data bus 106, and a control bus 108 respectively.

The A0-A2 lines of address bus 104 are connected to corresponding inputs of a pair of addressable latches 110 and 112. A data input D of latch 110 is connected to data line D7 of bus 106 while the D input of latch 112 is connected to the D4 data line of bus 106, according to a successful prototype. The D0-D5 data inputs of latch 114 are connected to the D0-D5 data lines of data bus 106.

Predetermined control signals are generated by microprocessor 102 for application to bus 108 and subsequently to the enable inputs $\overline{E}$ of addressable latches 110 and 112, and the clock input CLK of latch 114, for enabling respective ones of the latches.

The Q0-Q7 outputs of latch 110 are connected to respective ones of the aforementioned control inputs of crosspoint switching matrix 100. The 02 output of latch 114 is connected to a strobe input STR of matrix 100, while outputs 01 and 03-06 are connected to control inputs of further circuits, or alternatively left unconnected.

The Q0-Q3 outputs of latch 112 are connected to A, B, C and D inputs respectively of a quad switch circuit 116, and the Q4-Q7 outputs of latch 112 are connected to the A, B, C and D inputs respectively of a quad switch circuit 118. Inputs XA, XB, XC and XD of switch 116 are connected via balancing load resistors, shown generally as 120 to respective junctors Y0, Y1, Y2 and Y3 connected to the switching matrix 110. Similarly, junctors Y4-Y7 are connected via further balancing load resistors 122 to respective inputs XA, XB, XC and XD of switch 118. Outputs YA-YD of switches 116 and 118 are connected to the source of AC signal ground.

In operation, three parties may be connected to a predetermined one of the junctors, for example Y0 in response to microprocessor 102 generating predetermined control, data and address signals for application to the control inputs AX0-AX3, AY0-AY2 and DATA, of matrix 100 in a well known manner. Microprocessor 102 then generates further control, data, and address signals for application to the A input of switch 116 via latch 112.

In particular, microprocessor 102 generates an address signal having logic low levels on the A0-A2 address lines and a logic low level signal on the D4 data line, for application to the D input of latch 112. In response to application of an enable signal to the $\overline{E}$ input of latch 112, the Q0 output thereof goes to a logic low level, thereby disconnecting the internal connection between the XA input and YA output of switch 116.

In the event of a two party call on junctor Y0, microprocessor 102 generates a logic high level signal on the D4 data line, such that the Q0 output of switch 112 goes to a logic high level in response to an enable signal being received on the E̅ input thereof. In response, an internal connection is established between the input XA and output YA of switch 116 such that the corresponding one of the balancing resistors 120 is connected to the junctor, and acts as a dummy load for maintaining a constant load on the junctor.

A person understanding the present invention may conceive of other embodiments or variations thereof without departing from the sphere and scope as defined in the claims appended hereto.

I claim:

1. In a communication system for connecting and disconnecting a plurality of electronic hybrid circuits to and from a common signal bus, each of said hybrid circuits having a predetermined load impedance, a circuit for maintaining hybrid cancellation of signals carried by said bus; comprised of means for selectively connecting one or more balancing load impedances to said bus in response to disconnection of one or more of said plurality of hybrid circuits from the bus, and selectively disconnecting said one or more balancing load impedances from said bus in response to connection of said one or more of said plurality of hybrid circuits to the bus, such that a constant total load impedance is maintained on said bus, and gain control circuitry in each of said hybrid circuits for effecting hybrid cancellation of said signals relative to said constant total load impedance.

2. A circuit as defined in claim 1, wherein said bus is comprised of one or more junctors.

3. A circuit is defined in claim 1, wherein various ones of said hybrid circuits are connected to one or more outside telephone lines or local subscriber sets.

4. A circuit as defined in claim 1, wherein said balancing load impedances are resistors.

5. A circuit as defined in claim 1, wherein said balancing load impedances are 600 ohm resistors.

6. A circuit as defined in claim 1, wherein each of said hybrid circuits is comprised of a transmit amplifier for applying signals to said bus, an output resistor connected to said bus and said transmit amplifier for establishing said predetermined load impedance, a receive differential amplifier for receiving signals from said bus and a pair of input resistors connected to said receive amplifier and across said output resistor for setting the gain of said receive amplifier to achieve said hybrid cancellation of said signals.

7. A circuit as defined in claim 6, wherein said bus is comprised of one or more junctors.

8. A circuit as defined in claim 6, wherein various ones of said hybrid circuits are connected to one or more outside telephone lines or local subscriber sets.

9. A circuit as defined in claim 6, wherein said balancing load impedances are resistors.

10. A circuit as defined in claim 6, wherein said balancing load impedances are 600 ohm resistors.

11. A circuit as defined in claim 6, wherein said means for selectively connecting one or more balancing load impedances to said bus and selectively disconnecting said one or more balancing load impedances from said bus is comprises of a central controller for allocating the number of hybrid circuits connected to said bus and generating one or more control signals in response thereto, one or more resistors each having resistance equal to said predetermined load impedance and one terminal thereof connected to signal ground, and one of more switch circuits connected between said bus and respective ones of said resistors for receiving said control signals and selectively connecting and disconnecting said one or more resistors to and from said bus in response thereto.

12. A circuit as defined in claim 11, wherein said bus is comprised of one or more junctors.

13. A circuit as defined in claim 11, wherein various ones of said hybrid circuits are connected to one or more outside telephone lines or local subscriber sets.

14. A circuit as defined in claim 11, wherein said balancing load impedances are resistors.

15. A circuit as defined in claim 11, wherein said balancing load impedances are 600 ohm resistors.

* * * * *